March 31, 1964     I. HECHT     3,127,299
SHEET LAMINATING HAND TOOL
Filed April 12, 1962
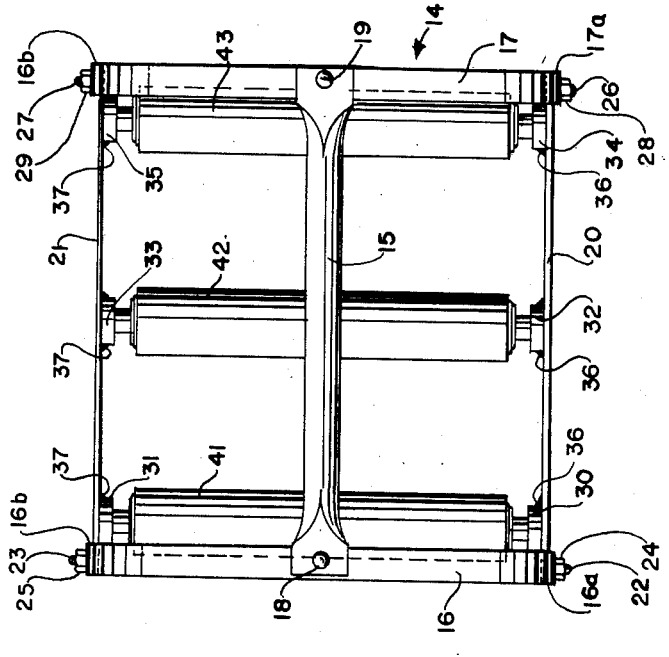
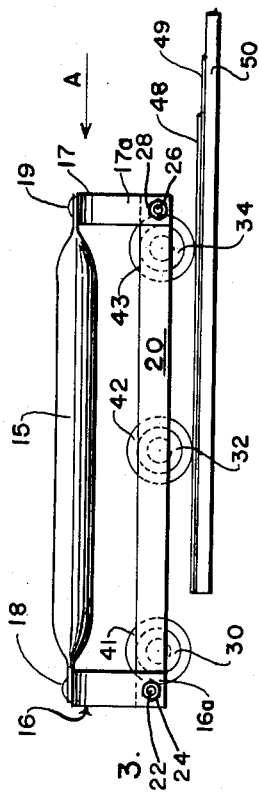
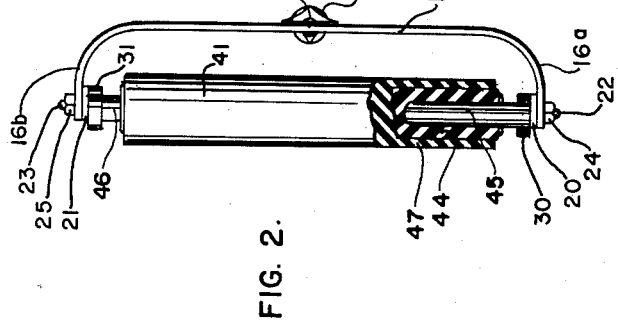
INVENTOR.
IRVIN HECHT
BY Pearce & Schaeperklaus
Attorneys

United States Patent Office

3,127,299
Patented Mar. 31, 1964

3,127,299
SHEET LAMINATING HAND TOOL
Irvin Hecht, 2451 Nova Ave., Cincinnati 38, Ohio
Filed Apr. 12, 1962, Ser. No. 187,085
2 Claims. (Cl. 156—579)

This invention relates to hand tools for smoothly applying or laminating finishing sheets to surfaces of objects.

An object of this invention is to provide a hand tool for smoothly applying finishing sheet material to surfaces coated with an adhesive.

Another object of this invention is to provide a device of the above character for placing a finishing lamina in intimate cooperation with an adhesive coating upon a supporting object or member.

Another object of this invention is to provide a device of the above character which simultaneously removes air bubbles and urges the exposed surface of the finishing sheet to a smooth condition effecting a corresponding redistribution of the subjacent adhesive coating.

Another object of this invention is to provide a tool which may be used with equal effectiveness over the entire area of the surfacing sheet including the areas contiguous to the edges thereof.

Another object of this invention is to provide a rigid frame, at least three parallel rollers supported by said frame for rotation and adapted to simultaneously cooperatively engage a planar surface.

A further object of this invention is to provide a tool of the above character having cylindrical rolls, at least the surface portions of which are firm but resilient.

The above and other objects and features of this invention will in part be obvious and will in part be apparent to those having ordinary skill in the art to which this invention pertains.

In the accompanying drawing and the following description of the embodiment disclosed therein, like reference characters indicate like parts.

In the drawing:

FIG. 1 is a top plan view of a finishing lamina applying tool which presently appears to be a preferred embodiment of the instant invention;

FIG. 2 is an end view, portions thereof being broken away to show details of construction;

FIG. 3 is a view in side elevation of the tool shown in FIGS. 1 and 2, in cooperative relation to a finish surfacing laminate being applied to a supporting member.

Surfacing material comprising plastics or resins alone or in combination with reinforcing materials are applied as finish surfaces to a wide variety of objects used in homes, business establishments and the like. These materials, sold under a variety of tradenames, are applied to furniture, kitchen counter tops, counters and equipment used in business establishments such as beauty salons, financial institutions, retail stores, and elsewhere. Finishing surfacing materials are normally supplied in large thin sheets from which pieces of suitable size and shape are cut to cover an area such as the flat top surface of a table or counter.

The flat top surface of the table or counter to be finished, is coated with a suitable adhesive and the finishing sheet material is laid in position upon the adhesive coating. Thereafter, the sheet must be placed in intimate cooperative contact with the adhesive material to effect a proper bonding or lamination of the finishing sheet to the structural element. Since the sheet material is dense and substantially non-porous in character, unevenness in the adhesive coating tend to entrap air bubbles, which must be removed for satisfactory application.

Heretofore, presses have been used to force the finishing sheet into intimate contact with the adhesive coating but such presses are expensive and inconvenient when large areas of members of uneven thickness, or areas of varying sizes are covered in a commercial establishment particularly those making objects to order. At times pounding with a rubber mallet or other hammer-like implement is practiced. Many press applications and most mallet applications result in objectionable distortion of the finish sheet which is indented by every mallet blow and often the press application pattern. These indentations appear to be due at least in part to displacement of adhesive and perhaps in part to distortion of the member subjacent the adhesive. Irrespective of the nature of the displacement of material subjacent to the sheeting, a permanent indentation results. These parmanent indentations in a surface of high finish are undesirable as they appear to be imperfections.

An elongate handle having a cylindrical roller mounted thereon for rotation about an axis extending transversely of the handle has enjoyed some usage, even though its use has been accomplished by substantial damage expenses in that when the roller inadvertently drops over the edge of the member to which finishing sheet is being applied, the roller's fall is augmented by the pressure exerted through the handle by the artisan and results in the handle striking the edge of the laminate sheet with more force than is necessary to nick, dent or chip the sheeting and usually the object to which the sheeting is being applied. Thus, in a counter, sink top, or table top, the entire top may be rendered unsaleable.

The instant tool has been found to substantially overcome the edge nicking problem while facilitating firm, smooth application of the finish sheeting without objectionable indentations or marring of the surface thereof.

Laminating tool 14, an illustrative embodiment of the instant invention, is shown in the drawing. Laminating tool 14 has an elongate handle 15 and a pair of spaced inverted U-shaped members 16, 17 secured to handle 15 by securing means, such as rivets 18, 19, to form a substantially rigid unitary frame. Inverted U-shaped member 16 has depending leg portions 16a and 16b adjacent its respective ends while similar inverted U-shaped member 17 has depending leg portions 17a and 17b adjacent its respective ends. A pair of side rails 20, 21 are provided. Side rail 20 is secured to leg portion 16a by screw bolt 22 in cooperation with nut 24 and in similar fashion to leg 17a by screw 26 and nut 28, the screws 22, 26 and nuts 24, 28 serving to clamp side rail 20 in fixed relation to legs 16a and 17a. In a similar fashion screw 23 and nut 25 secure side rail 21 to leg 16b while screw 27 and nut 29 secure the opposite end of side rail 21 to leg 17b. If desired, screws 22, 23, 26, and 27 may threadedly engage either the respective side rail or leg, in which case nuts such as 24, 25, 28, and 29 may be omitted or may serve as lock nuts.

Three bearings, such as ball bearings 30, 32, 34, are secured to side rail 20 by suitable means such as welds 36. Bearings 30 and 34 are preferably equally spaced from bearing 32. Similarly, bearings 31, 33, and 35 are secured by suitable means such as welds 37 to side rail 21 in positions corresponding to those of bearings 30, 32, and 34.

Three similar cylindrical rollers 41, 42 and 43 are respectively journalled for rotation about parallel coplanar axes in bearings 30—31, 32—33, 34—35.

As shown in FIG. 2, roller 41 may have a firm stiff rubber-like core 44 in the end portions of which are embedded stub shaft portions 45, 46. The stub shaft portions 45, 46 substanitally limit flexation of the center line of the roll, to that central portion into which the stub shafts do not extend. An outer layer 47 of soft resilient rubber or rubber-like material surrounds the periphery of the core 44. Outer layer 47 tends to mash under increasing pressure, increasing the area of contact and tending to limit the increase of pressure between the roll and the surface engaged by it. Thus, the physical properties of the core 44 and outer layer 47 may be selected in view of the application pressures desired. As shown in FIG. 2, the over-all length of the roll and stub shafts in unitary relation thereto, may be substantially equal to the distance between the opposed faces of side rails 20, 21 so as to limit end play.

An artisan using the tool 14 can grasp handle 15 with both hands and lean heavily upon the tool to exert substantial pressure through it upon lamina 48, adhesive 49 and member 50. The force applied by each hand is of substantially equal moment about roll 42 and substantially balances that applied by the other hand. Thus when tool 14 is moved in the direction of arrow A into a position as is illustrated in FIG. 3, no substantial tipping of tool 14 occurs and nicking, denting and chipping are avoided. Further, the rolling cooperation of rolls 41, 42, 43 with lamina 48 tends to work out any air bubbles trapped under lamina 48 while simultaneously tending to so distribute adhesive 49 that a smooth application of lamina 48 results. It may be noted that the location and orientation of handle 15 contribute to application of substantially equal load or force to both ends of any one of the rolls, thereby avoiding uneven pressures of application which may result in waviness of the surface or crease-like depressions therein, due to heavy pressure applied to only one end of the roll while light or even negative pressure is applied to the other end thereof. However, in the event it is desired, greater pressure may be applied to areas adjacent the edge of the lamina being applied. This is possible because of the limited flexibility of the central portion of the core disposed generally beneath the handle 15 which permits use of the tool with approximately one half of each roll engaging lamina 48 and the remainder overhanging the edge thereof so that greatest pressure may be applied adjacent the edge.

Having thus described what presently appears to be a preferred embodiment of my invention, it will be apparent to those having ordinary skill in the art to which this invention pertains, that various modifications and changes may be made in the illustrative embodiment without departing from the spirit or the scope of the appended claims.

Therefore, what is claimed as new, and is desired to be secured by Letters Patent is:

1. A hand tool for pressing a surfacing lamina into smooth intimate contact with an adhesive coated surface to which the lamina is to be adhered, said tool comprising in combination a pair of arched span members, a handle member joining the central portions of the span members and securing same in spaced parallel relation to each other, a pair of side members each respectively coupled to an end of each of said span members, and three resilient cylindrical rollers cooperating with and supported for rotation about respective parallel coplanar axes by said side members, each of said rollers being flexible to permit bowing of the axis thereof when said roll is subjected to substantial bowing force, whereby the tool may be held by said handle member extending transversely of the roller axes and pressingly rolled over a lamina to smoothly apply same and level the adhesive coat securing the lamina.

2. A device according to claim 1 characterized by the fact that each resilient cylindrical roller has a stiff but bowable resilient core, axial stub shafts stiffening said core adjacent its ends, and a cover layer of rubber-like material which is softer than said core.

References Cited in the file of this patent

UNITED STATES PATENTS

| | | |
|---|---|---|
| 2,123,415 | Gorbatenko | July 12, 1938 |
| 2,225,229 | Neuwirth | Dec. 17, 1940 |
| 2,490,616 | Brabazon | Dec. 6, 1949 |